(12) United States Patent
Kimura et al.

(10) Patent No.: US 11,410,408 B2
(45) Date of Patent: Aug. 9, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Shunichi Kimura, Kanagawa (JP); Masanori Sekino, Kanagawa (JP); Satoshi Kubota, Kanagawa (JP); Yutaka Koshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 13 days.

(21) Appl. No.: 16/851,110

(22) Filed: Apr. 17, 2020

(65) Prior Publication Data

US 2021/0124970 A1 Apr. 29, 2021

(30) Foreign Application Priority Data

Oct. 24, 2019 (JP) .............................. JP2019-193250

(51) Int. Cl.
*G06V 10/26* (2022.01)
*G06V 30/32* (2022.01)
*G06V 30/224* (2022.01)
*G06V 30/10* (2022.01)

(52) U.S. Cl.
CPC ............. *G06V 10/26* (2022.01); *G06V 30/224* (2022.01); *G06V 30/32* (2022.01); *G06V 30/10* (2022.01)

(58) Field of Classification Search
CPC ........ G06K 9/34; G06K 9/00402; G06K 9/18; G06K 2209/01; G06V 10/26; G06V 30/224; G06V 30/32; G06V 30/10; G06V 30/153
See application file for complete search history.

(56) References Cited

U.S. PATENT DOCUMENTS

| | | | |
|---|---|---|---|
| 7,133,556 B1 | 11/2006 | Matsushita et al. | |
| 10,176,399 B1* | 1/2019 | Rivard | G06K 9/344 |
| 10,445,569 B1* | 10/2019 | Lin | G06F 40/279 |
| 2018/0189592 A1* | 7/2018 | Annis | G06K 9/344 |
| 2018/0260652 A1* | 9/2018 | Collet | G06K 9/348 |

FOREIGN PATENT DOCUMENTS

| | | | |
|---|---|---|---|
| CN | 108345880 A | * | 7/2018 |
| CN | 110032920 A | * | 7/2019 |
| CN | 110134792 A | * | 8/2019 |
| JP | H06309464 | | 11/1994 |
| JP | 2000259847 | | 9/2000 |

(Continued)

*Primary Examiner* — Matthew C Bella
*Assistant Examiner* — Kathleen M Broughton
(74) *Attorney, Agent, or Firm* — JCIPRNET (57) ABSTRACT

An information processing apparatus includes a processor configured to execute first acquisition processing for acquiring a first recognition result and a first recognition probability on target data from a first recognizer, execute second acquisition processing for acquiring a second recognition probability for the first recognition result on the target data from a second recognizer, and execute control for determining which of first processing and second processing with a necessary human workload greater than in the first processing is to be executed for the first recognition result based on the first recognition probability and the second recognition probability.

7 Claims, 8 Drawing Sheets

(56) References Cited

FOREIGN PATENT DOCUMENTS

| JP | 2001084336 | 3/2001 | | |
|----|------------|--------|---|---|
| JP | 2003346080 | 12/2003 | | |
| JP | 2010073201 | 4/2010 | | |
| JP | 2014120032 A | * | 6/2014 | |
| WO | WO-2019076191 A1 | * | 4/2019 | ........... G06F 40/279 |

* cited by examiner

RELATED ART

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-193250 filed Oct. 24, 2019.

BACKGROUND

(i) Technical Field

The present invention relates to an information processing apparatus and a non-transitory computer readable medium storing a program.

(ii) Related Art

A data input system that converts a text string handwritten or printed on a paper document into digital data is known. The data input system digitizes a text string on a document using a system in which a person reads the document and inputs the text string through key input, a system in which a text recognizer using an optical text recognition (optical character recognition (OCR)) technique executes text recognition processing on an image on the document, or a combination of the systems.

Many text recognizers have a function of outputting a degree indicating how reliable a processing result of executed recognition processing is. The degree is referred to as a probability or certainty (hereinafter, referred to as a recognition probability or simply referred to as a probability).

JP2000-259847A describes an apparatus that, in a case where a recognition probability output from a text recognizer along with a text code of a recognition result on a text image is equal to or greater than a threshold value, displays the text code, and in a case where the recognition probability is lower than the threshold value, displays the text image and requests a user for a manual input.

An apparatus disclosed in JP2003-346080A performs an output without needing manual verification in a case where a recognition probability is equal to or higher than a threshold value, and performs manual verification otherwise.

SUMMARY

Aspects of non-limiting exemplary embodiments of the present disclosure relate to an information processing apparatus and a non-transitory computer readable medium storing a program that reduce a necessary human workload compared to a system in which control for determining which of first processing and second processing requiring a human workload greater than in the first processing is to be executed for a recognition result of a recognizer on target data only based on a recognition probability for the recognition result of the recognizer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to execute first acquisition processing for acquiring a first recognition result and a first recognition probability on target data from a first recognizer, execute second acquisition processing for acquiring a second recognition probability for the first recognition result on the target data from a second recognizer, and execute control for determining which of first processing and second processing with a necessary human workload greater than in the first processing is to be executed for the first recognition result based the first recognition probability and the second recognition probability.

BRIEF DESCRIPTION OF THE DRAWINGS

Exemplary embodiment(s) of the present invention will be described in detail based on the following figures, wherein.

DETAILED DESCRIPTION

Example of Overall System

Figure 1:
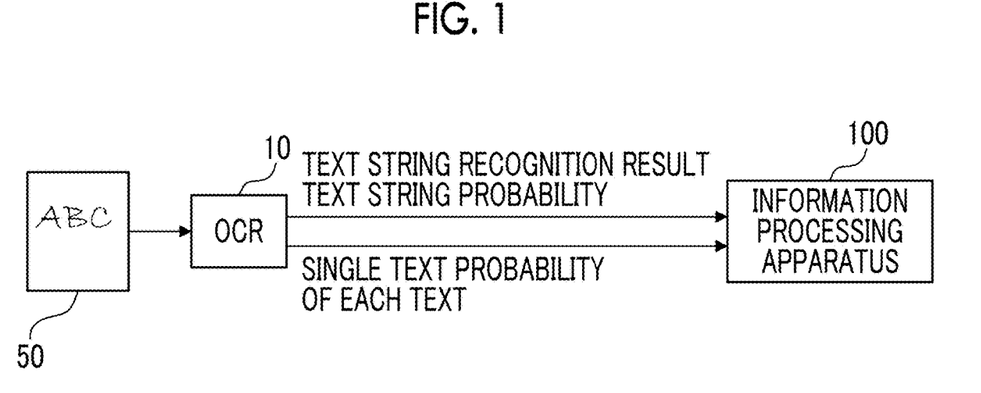
FIG. 1 is a diagram illustrating a system configuration of an exemplary embodiment of text string recognition.

Referring to FIG. 1, an exemplary embodiment of a data input system (hereinafter, simply referred to as a "system") will be described.

In the system, input image data 50 that is a target of text recognition is input to an OCR (text recognizer) 10. The OCR 10 executes text recognition processing on the input image data 50. The input image data 50 is image data including an image of a text string. For example, an image of a certain input field cut from a document image through preprocessing becomes the input image data 50.

The OCR 10 cuts an image of each text from the input image data 50 and executes text recognition processing on the image of each text (hereinafter, referred to as a "text image"), thereby a recognition result of each text image and a probability for the recognition result. The recognition result is a text code of the text represented by the text image. The OCR 10 obtains one or more candidates of the recognition result for one text image and obtains a probability for each candidate. A plurality of candidates obtained for the same text image can be given priority in a descending order of the corresponding probability. The candidate of the recognition result obtained for the text image and the probability corresponding to the candidate are hereinafter referred to as a single text candidate and a single text probability.

The OCR 10 performs recognition of a text string represented by the input image data 50. In the recognition of the text string, for example, a text string is generated by arranging the single text candidates as the recognition results of the respective text images in an arrangement order of the respective text images in the input image data 50, and the text string is evaluated. Since there are a plurality of single text candidates for each text image, different text strings can be generated by the number of combinations of the single text candidates of the respective text images. The OCR 10 performs evaluation for each of the text strings. In the evaluation, for example, an evaluation value of each text string is calculated by referring to information regarding ease of connection between texts, a dictionary in which words or phrases are registered, or the like. Then, the OCR 10 outputs the text string having the highest evaluation value as a recognition result corresponding to the input image data 50. The recognition result for the text string is referred to as a text string recognition result. The OCR 10 calculates a probability corresponding to the text string recognition result and outputs the probability. The probability is referred to as a text string probability.

The OCR 10 performs the above-described processing using the known technique of the related art. Although an OCR of the related art outputs a text string recognition result and a text string probability, the OCR 10 illustrated in FIG. 1 further outputs the single text probability for each text code included in the text string recognition result.

The OCR 10 can also be regarded as an apparatus embedded with a first recognizer that performs recognition of an individual text and a second recognizer that performs recognition of the whole text string using the recognition result of the individual text in the first recognizer.

An information processing apparatus 100 executes processing for obtaining a final recognition result on the input image data 50 as a system based on information input from the OCR 10.

Example of Hardware Configuration

Figure 2:
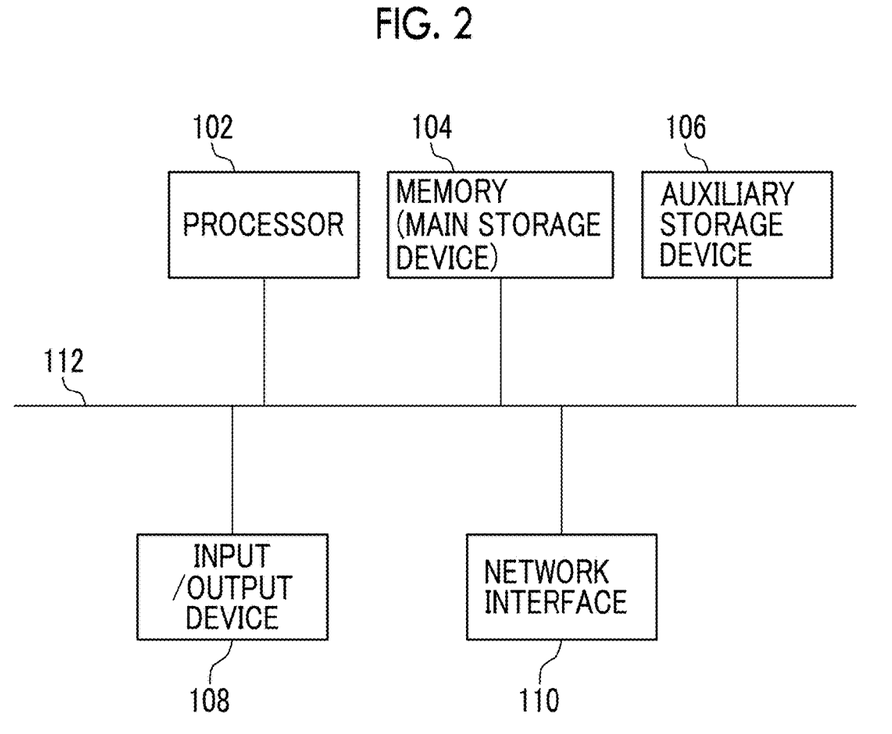
FIG. 2 is a diagram illustrating a hardware configuration of a computer that executes major information processing of the system.

The information processing apparatus 100 is constructed, for example, based on a general-purpose computer. That is, the information processing apparatus 100 has a circuit configuration in which, as shown in FIG. 2, a processor 102, a memory (main storage device) 104, such as a random access memory (RAM), a controller, which controls an auxiliary storage device 106, such as a flash memory, a solid state drive (SSD), or a hard disk drive (HDD), an interface for connection to various input/output devices 108, a network interface 110, which performs control for connection to a network, such as a local area network, and the like as hardware are connected through a data transmission path, such as a bus 112. A program group that indicates the functions of the information processing apparatus 100 described below is installed on the computer by way of the network or the like and is saved in the auxiliary storage device 106. The program group saved in the auxiliary storage device 106 is executed by the processor 102 using the memory 104, whereby the functions of the information processing apparatus 100 are implemented.

In the embodiments above, the term "processor 102" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor 102" is broad enough to encompass one processor 102 or plural processors 102 in collaboration which are located physically apart from each other but may work cooperatively. The order of operations of the processor 102 is not limited to one described in the embodiments above, and may be changed.

In the example shown in FIG. 1, the OCR 10 is an apparatus external to the information processing apparatus 100. The OCR 10 is, for example, a dedicated OCR apparatus connected to the information processing apparatus 100 by a communication cable or the like or may be an OCR service on the Internet. The information processing apparatus 100 may be embedded with the OCR 10. For example, the information processing apparatus 100 executes a program representing the functions of the OCR 10.

Example of Processing Procedure of Related Art

Figure 3:
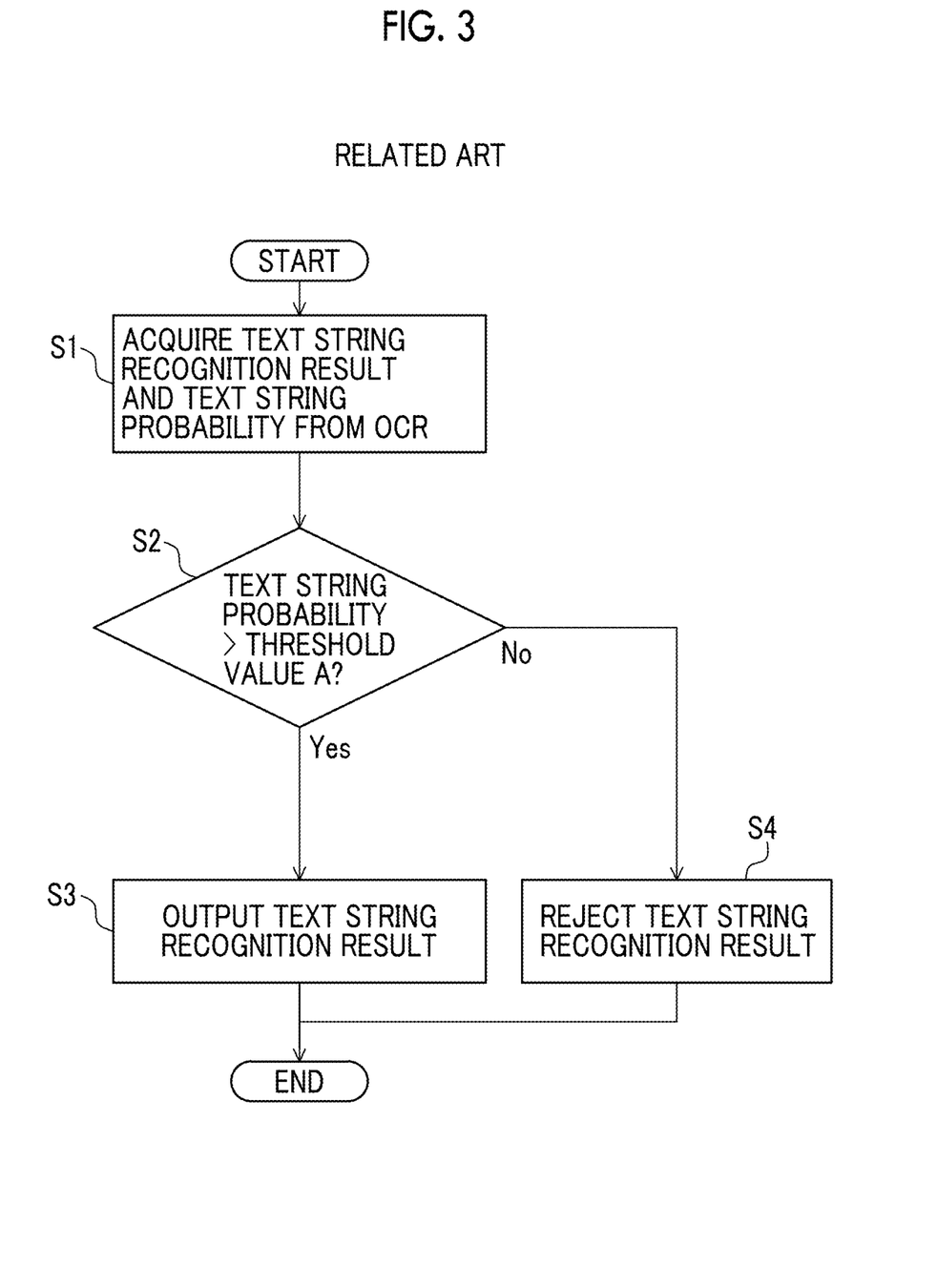
FIG. 3 is a diagram illustrating a processing procedure of the related art.

A processing procedure in a case where the information processing apparatus 100 performs text string recognition using a system of the related art is illustrated in FIG. 3.

In the procedure, the processor 102 acquires the text string recognition result and the text string probability from the OCR 10 (S1), and determines whether or not the text string probability is higher than a predetermined threshold value A (S2). In a case where a determination result is Yes, the processor 102 outputs the text string recognition result as a final recognition result of the system (S3). In a case where the determination result of S2 is No, the processor 102 rejects the text string recognition result (S4). The term "reject" refers to that a text recognition result to be a target is not adopted as the final recognition result of the system. In a case where the text string recognition result of the OCR 10 is rejected, in S4, the processor 102 requests an operator for intervention. In this case, the processor 102 displays the input image data 50 on a predetermined terminal of the operator and receives an input of the text string represented by the input image data 50 from the operator. Alternatively, the processor 102 displays the text string recognition result on the terminal of the operator along with the input image data 50 and receives verification and correction on the text string recognition result from the operator. In this case, the operator compares the input image data 50 and the text string recognition result displayed on the terminal, in a case where determination is made that the text string of the text string recognition result is correct, performs an operation of verification on the text string, and in a case where determination is made that the text string is incorrect, corrects the text string. The processor 102 outputs the text string verified or corrected by the operator in this way as the final recognition result of the system.

In this way, in the system of the related art, in a case where the text string probability is sufficiently high (that is, higher than a threshold value A), the text string recognition result is adopted as the final recognition result without human intervention.

Processing Procedure of Exemplary Embodiment

Figure 4:
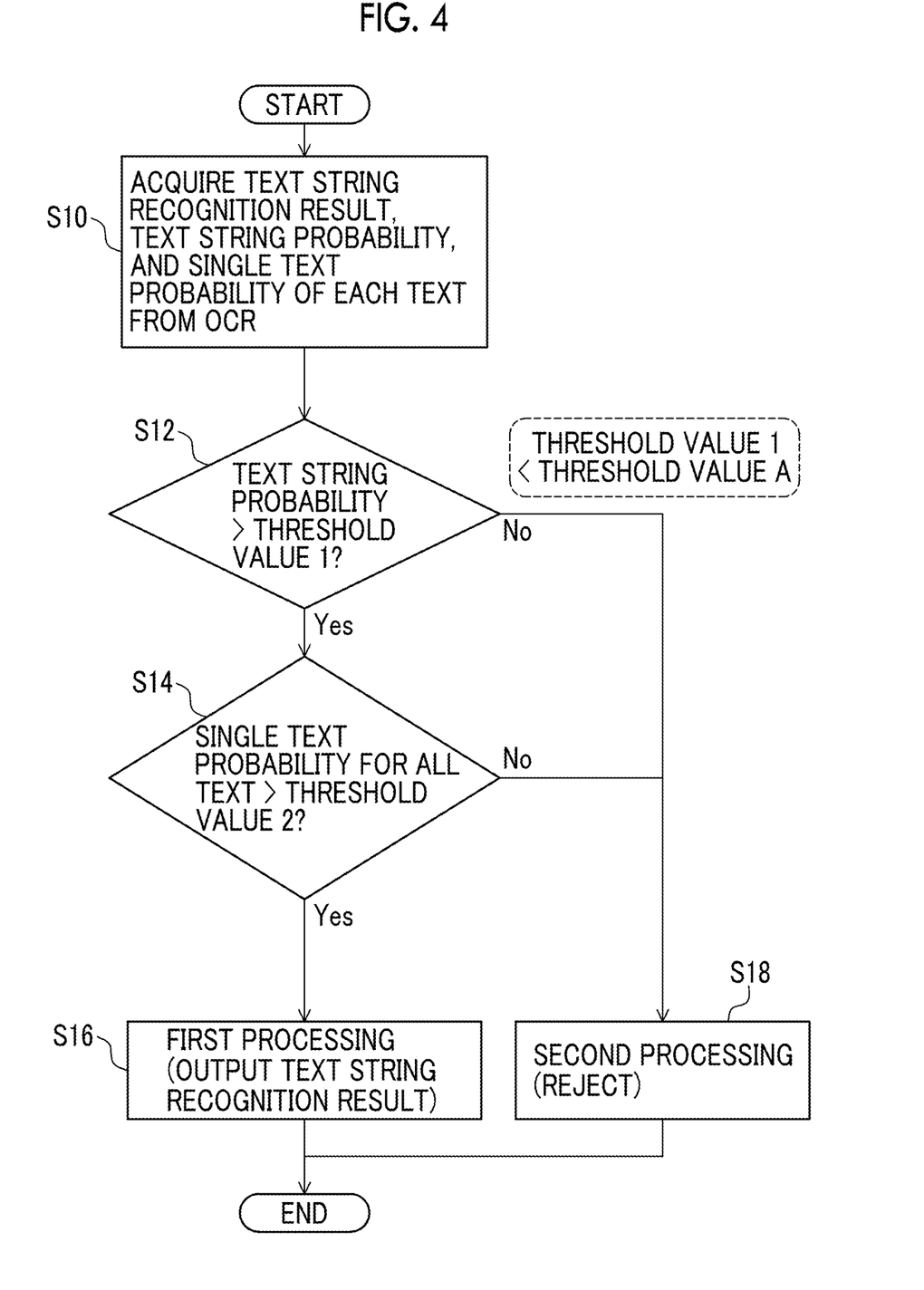
FIG. 4 is a diagram illustrating a processing procedure of a system of the exemplary embodiment.

A processing procedure of the exemplary embodiment in contrast to the procedure of the related art is illustrated in FIG. 4.

In the procedure, the processor 102 acquires the text string recognition result, the text string probability, and the single text probability of each text included in the text string recognition result from the OCR 10 (S10). Next, the processor 102 determines whether or not the acquired text string probability is higher than a predetermined threshold value 1 (S12). The threshold value 1 used in the determination may be a value lower than the threshold value A used in S2 of the procedure of the related art in FIG. 3.

In a case where a determination result of S12 is Yes, the processor 102 further compares the single text probability of the single text result of each text included in the text string recognition result with a predetermined threshold value 2. The threshold value 2 may be, for example, a value common to all texts. Then, the processor 102 determines whether or not the single text probability is higher than the threshold value 2 for all texts included in the text string recognition result (S14). In a case where there is at least one text, of which the single text probability is equal to or lower than the threshold value 2, among the texts of the text string recognition result, a determination result of S14 is No.

In a case where the determination result of S14 is Yes, the processor 102 executes first processing (S16). On the other hand, in a case where the determination result of S12 or S14 is No, the processor 102 executes second processing (S18).

The first processing is processing with a workload of the operator relatively smaller than the second processing. For example, processing in which the text string recognition result is output as a final processing result in an intact manner without operator intervention as in S3 of the procedure in FIG. 2 is an example of the first processing, and processing in which the text string recognition result is rejected and subjected to verification and correction by the operator is an example of the second processing.

As another example of the first processing, there is processing in which only the verification of the text string recognition result is requested to the operator. In the processing, the processor 102 displays the input image data 50 and the text string recognition result on a screen of a terminal of the operator and requests the operator for an input of a verification result regarding whether or not the text string recognition result is correct. As another example of the second processing in lieu of the verification and correction of the operator, there is processing in which the input image data 50 is presented to the operator to make the operator input text data of the text string included in the input image data 50.

In the procedure of FIG. 4, the execution order of S12 and S14 may be reversed.

Since the first processing requires a human workload smaller than the second processing, a human workload necessary as the whole system is reduced as a probability that the first processing is selected is higher. In the exemplary embodiment, the single text probability is used in addition to the text string probability used in the related art, whereby the probability that the first processing is selected increases. This will be described referring to FIG. 5.

Figure 5:
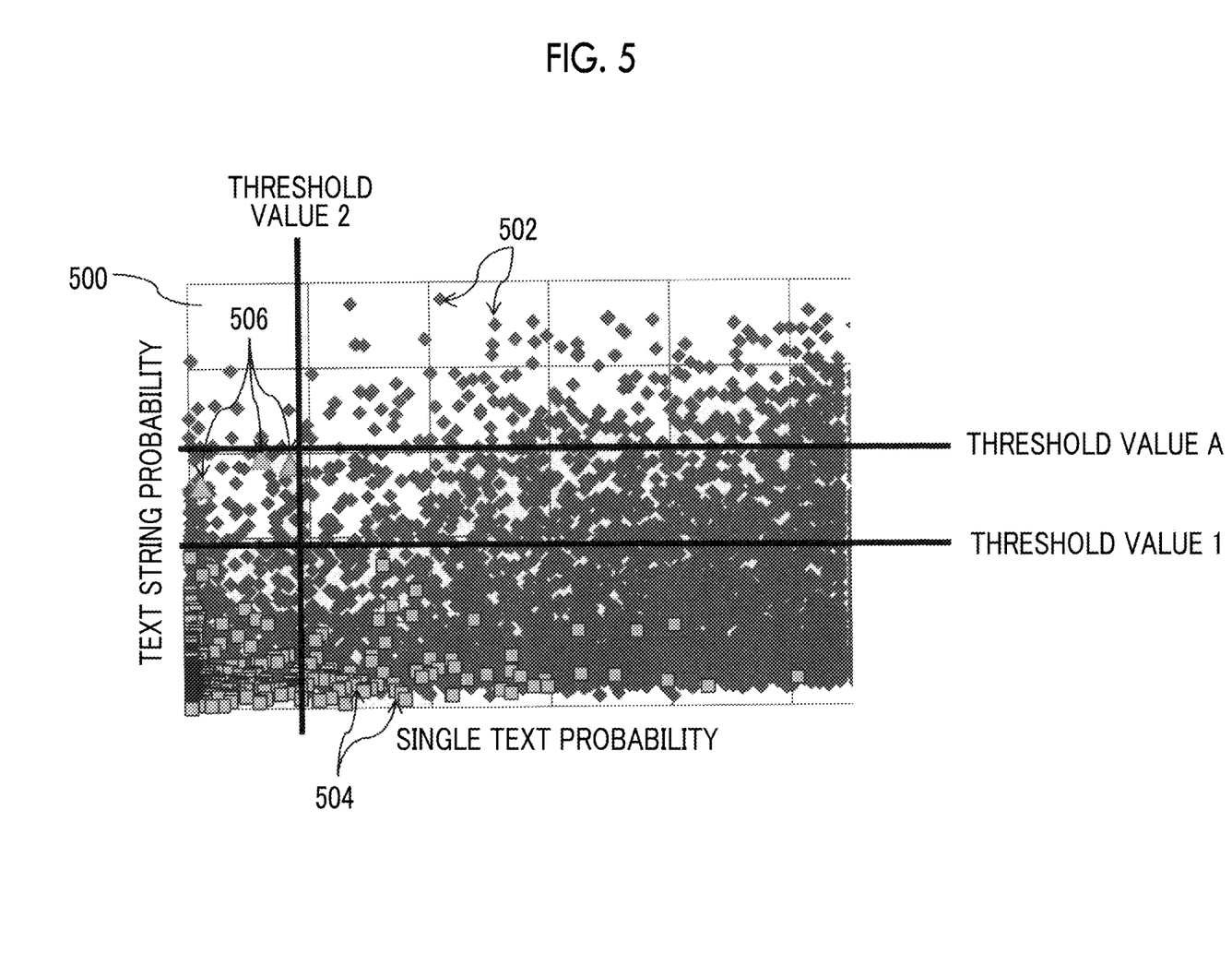
FIG. 5 is a diagram illustrating effects that are obtained by the system.

FIG. 5 shows a scatter diagram 500 of recognition results when the OCR 10 is made to recognize a large number of sample input images. In the scatter diagram 500, the vertical axis is the text string probability, and the horizontal axis is a representative value of the single text probabilities (for example, a lowest value among the single text probabilities of each text in the text string recognition result). The text string probability is higher toward an upper side, and the single text probability is higher toward a left side. A dark rhombic plot 502 indicates a sample of correct recognition, and light square and triangular plots 504 and 506 indicate samples of incorrect recognition.

In the distribution shown in FIG. 5, the text string probability has to be higher than the threshold value A shown in the drawing in order to make an accuracy rate be a sufficiently high value (that is, a value close to 100% and equal to or greater than a predetermined threshold value) only using the text string probability. In contrast, in a case where the single text probability is also used, the accuracy rate becomes a sufficiently high value in a case where the text string probability is higher than the threshold value 1 shown in the drawing and the single text probability is higher than the threshold value 2. In comparison of a range where the text string probability is higher than the threshold value A and a range where the text string probability is higher than the threshold value 1 and the single text probability is higher than the threshold value 2, the latter range includes a greater number of plots 502 of correct recognition. Accordingly, in the latter range, while the accuracy rate is maintained, the proportion of the text string recognition results, to which the first processing with a relatively small human workload is applied, increases.

Threshold Value Setting

The system of the exemplary embodiment may provide a user interface (UI) screen on which settings of the threshold values used in the determination are received from a user.

Figure 6:
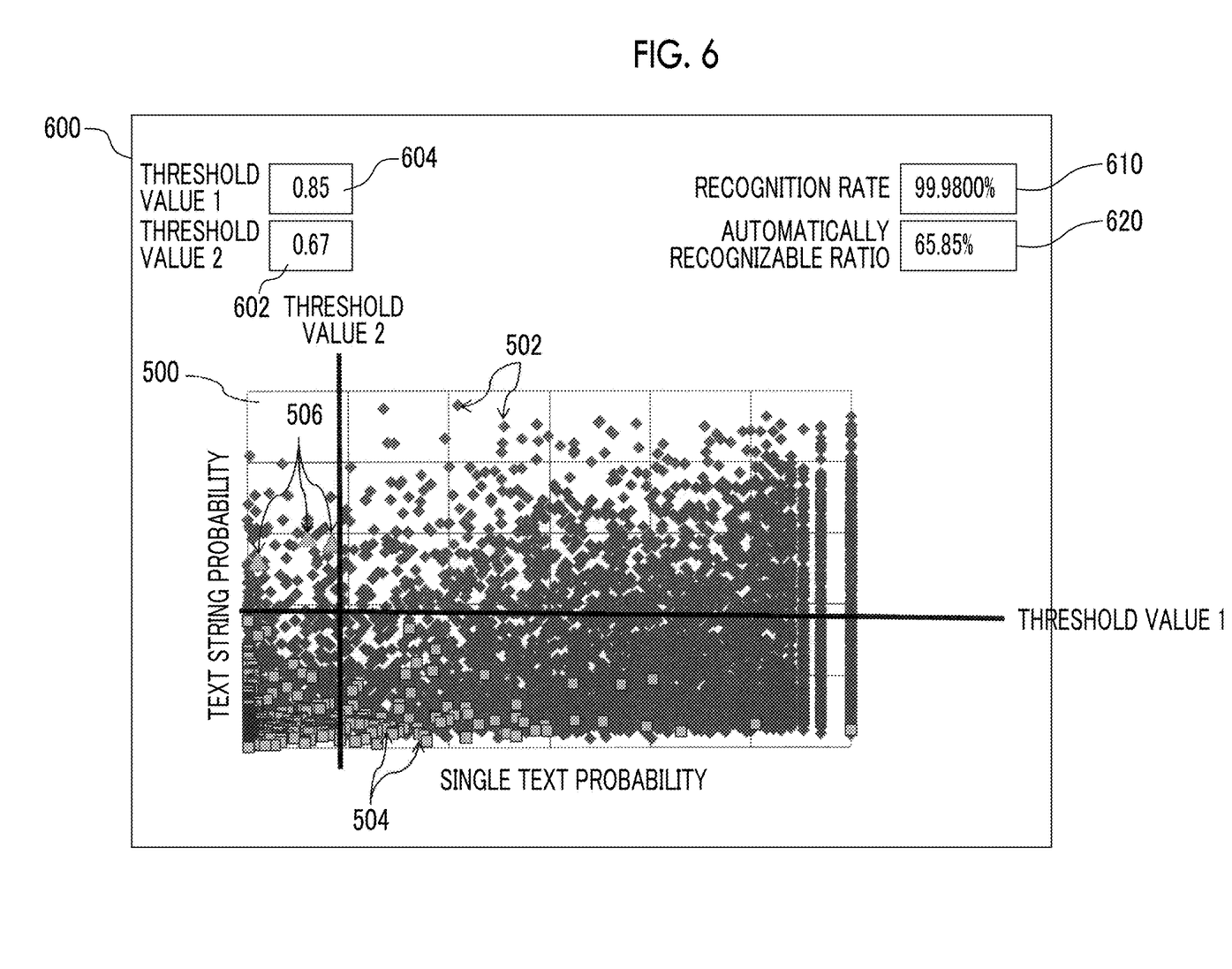
FIG. 6 is a diagram schematically showing an example of a UI screen for setting a threshold value.

FIG. 6 illustrates a UI screen 600. The UI screen 600 is provided for setting the threshold value 1 and the threshold value 2 used in the procedure illustrated in FIG. 4.

The UI screen 600 displays the same scatter diagram 500 as illustrated in FIG. 5. On the scatter diagram 500, settings of the threshold value 1 on the text string probability and the threshold value 2 on the single text probability are received. The threshold value 1 is shown as a horizontal line crossing the scatter diagram 500, and the threshold value 2 is shown as a vertical line intersecting the scatter diagram 500. The user inputs the values of the threshold values to an input field 602 of the threshold value 1 and an input field 604 of the threshold value 2. The lines of the threshold values shown on the scatter diagram 500 are displayed at positions according to the threshold values in the input fields 602 and 604.

In the UI screen 600, a recognition rate display field 610 and a ratio display field 620 are shown. In the recognition rate display field 610, a recognition rate that is implemented by a threshold value group set by the user is shown. The recognition rate is a recognition rate in a case where the first processing (S16) is executed in the procedure of FIG. 4, that is, an accuracy rate. In the example, it is assumed that the first processing is processing for outputting the text string recognition result as the final recognition result of the system. The recognition rate that is displayed in this case is a ratio of correct recognition of the corresponding text string recognition result based on the set threshold value group among the total number of sample images of a sample image group, for which both of the determination results of S12 and S14 are Yes. The ratio display field 620 displays a ratio of application of the first processing (S16) based on the set threshold value group among the total number of sample images. The higher the ratio is, the smaller a necessary human workload is. The user verifies the values displayed in the recognition rate display field 610 and the ratio display field 620 while changing the respective threshold values, and decides a combination of the threshold values such that intended performance is obtained.

Modification Example of Processing Procedure of FIG. 4

A modification example of a procedure that is executed by the processor 102 of the exemplary embodiment will be described referring to FIG. 7.

Figure 7:
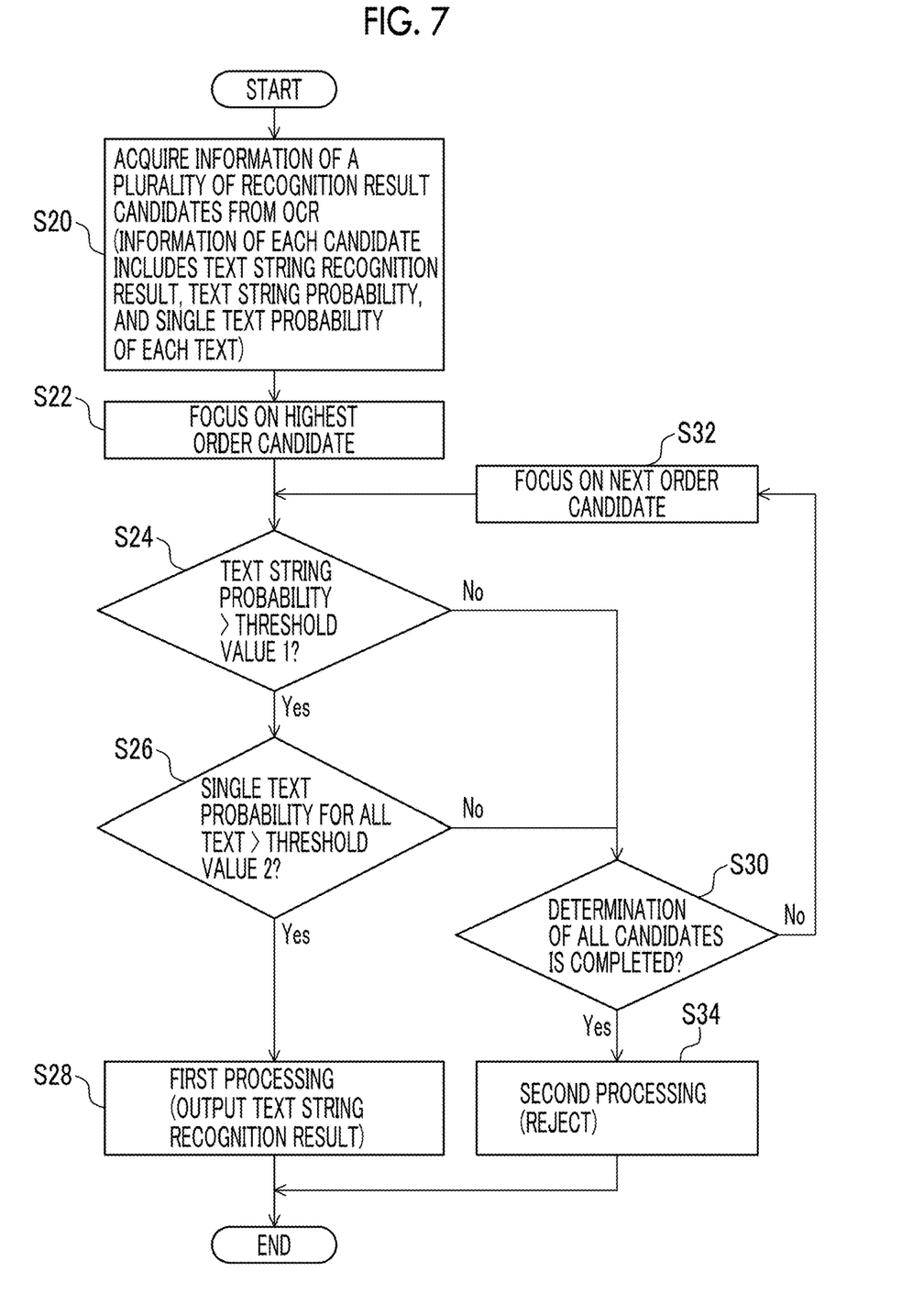
FIG. 7 is a diagram showing another example of a processing procedure of the system of the exemplary embodiment.

In the procedure of FIG. 7, the processor 102 acquires information regarding candidates of a plurality of recognition results from the OCR 10 (S20). In the procedure of FIG. 4, the processor 102 acquires one text string recognition result having the highest text string probability from the OCR 10. In contrast, in S20, a plurality of text string recognition results are acquired as candidates in a descending order of the text string probability. The number of candidates to be acquired may be, for example, a predetermined number. Alternatively, for example, the text string recognition result having the highest text string probability and the text string recognition results having the text string probability within a predetermined difference or equal to or greater than a predetermined ratio with respect to the highest text string probability may be acquired as candidates. In this way, the number of candidates to be acquired may be changed according to a recognition target. Furthermore, the text string recognition results having the text string probability higher than the threshold value 1 may be selected as candidates. The threshold value 1 is the same as the threshold value used in the procedure of FIG. 4. In S20, the processor 102 acquires, for each candidate, the text string recognition result, the text string probability corresponding to the text string recognition result, and the single text probability of each text included in the text string recognition result.

Next, the processor 102 sets a candidate having the highest text string probability as a candidate of interest (S22), and determines whether the text string probability of the candidate of interest is higher than the threshold value 1 (S24), and whether all of the single text probabilities of the respective texts of the candidate of interest are higher than the threshold value 2 (S26). In a case where both of determination results of S24 and S26 are Yes, the processor 102 executes first processing on the text string recognition result of the candidate of interest (S28). The first processing is processing in which the text string recognition result of the candidate of interest is output as the final recognition result of the system.

In a case where at least one of the determination result of S24 or S26 is No, the processor 102 determines whether or not the determination of S24 and S26 is completed for all candidates acquired in S20 (S30). In a case where a determination result of S30 is No, the processor 102 sets a next candidate, that is, a candidate having the next highest text string probability after the candidate of interest as a new candidate of interest (S32), and repeats the determination of S24 and S26. In the repetition of the processing described above, in a case where the determination result of S30 is Yes, this means that there is no candidate, for which both of the determination results of S24 and S26 are Yes, among the candidates. In this case, the processor 102 executes second processing (S34). The second processing is processing that requires more operations of a person than the first processing, and for example, processing in which the text string recognition result of the candidate having the highest text string probability is subjected to verification and correction by the operator is an example of the second processing.

With the procedure of FIG. 7 described above, the number of cases where the first processing (S28) is applied increases compared to the procedure of FIG. 4 in which only the text string recognition result having the highest text string probability is determined, and a human workload is reduced as much.

In the procedure of FIG. 7, although the candidates are evaluated in a descending order of the text string probability, and a candidate, for which both of the determination results of S24 and S26 are initially Yes, is subjected to the first processing (S28), such a procedure is just an example. Instead, for example, the determination of S24 and S26 may be performed for all candidates, and a candidate having the highest evaluation value according to overall evaluation of the text string probability and the single text probability among the candidates, for which both of the determination results of S24 and S26 are Yes, may be subjected to the first processing.

Example of Generalized System Configuration

The system described above uses the text string probability and the single text probability calculated by one OCR 10.

Figure 8:
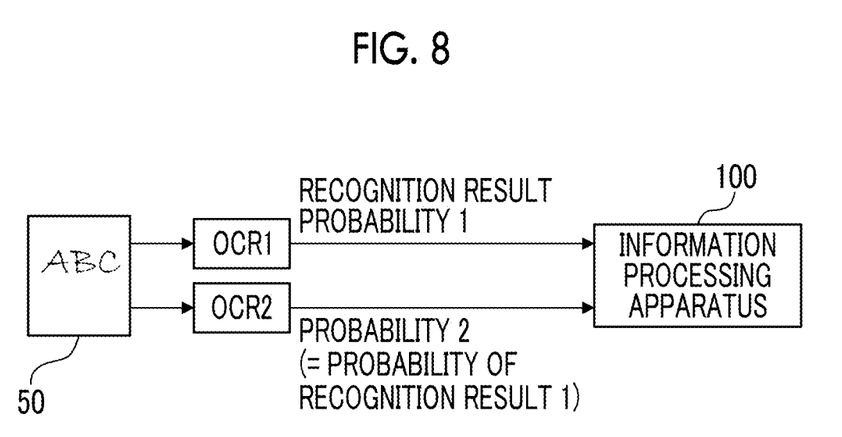
FIG. 8 is a diagram illustrating a system configuration of a generalized exemplary embodiment.

In contrast, a system illustrated in FIG. 8 includes two OCRs of OCR1 and OCR2. The OCR1 and the OCR2 execute different kinds of text recognition processing from each other. That is, the OCR1 and the OCR2 use, for example, different text recognition programs from each other or different sets of learning data for learning of text recognition from each other. Ina case where a group of a sufficiently large number of sample images is processed by the OCR1 and the OCR2, a distribution of a correct answer (that is, correct recognition) and an incorrect answer (that is, incorrect recognition) of OCR results on the sample image group is different between the OCR1 and the OCR2. The OCR1 and the OCR2 recognize the same input image data 50. In the example, the OCR1 is a recognizer to be a reference, and the OCR2 is for assistance.

The information processing apparatus 100 acquires a recognition result (referred to as a "recognition result 1") on the input image data 50 and a recognition probability (referred to as a "probability 1") on the recognition result 1 from the OCR1. The recognition result 1 has the highest probability among the recognition results of the OCR1 on the input image data 50. Furthermore, the information processing apparatus 100 acquires a recognition probability (referred to as a "probability 2") for the same recognition result as the recognition result 1 of the OCR1 among the recognition results on the input image data 50 from the OCR2. For example, a case where the recognition result 1 of the OCR1 on certain input image data 50 is "ABC" is considered. While the OCR2 obtains several candidates of the recognition results on the input image data 50 and the probabilities for the candidates, the information processing apparatus 100 acquires the probability of the candidate having the value "ABC" among the candidates as the probability 2.

Then, the information processing apparatus 100 executes processing for obtaining a final recognition result on the input image data 50 as the system using information acquired from the OCR1 and the OCR2.

Figure 9:
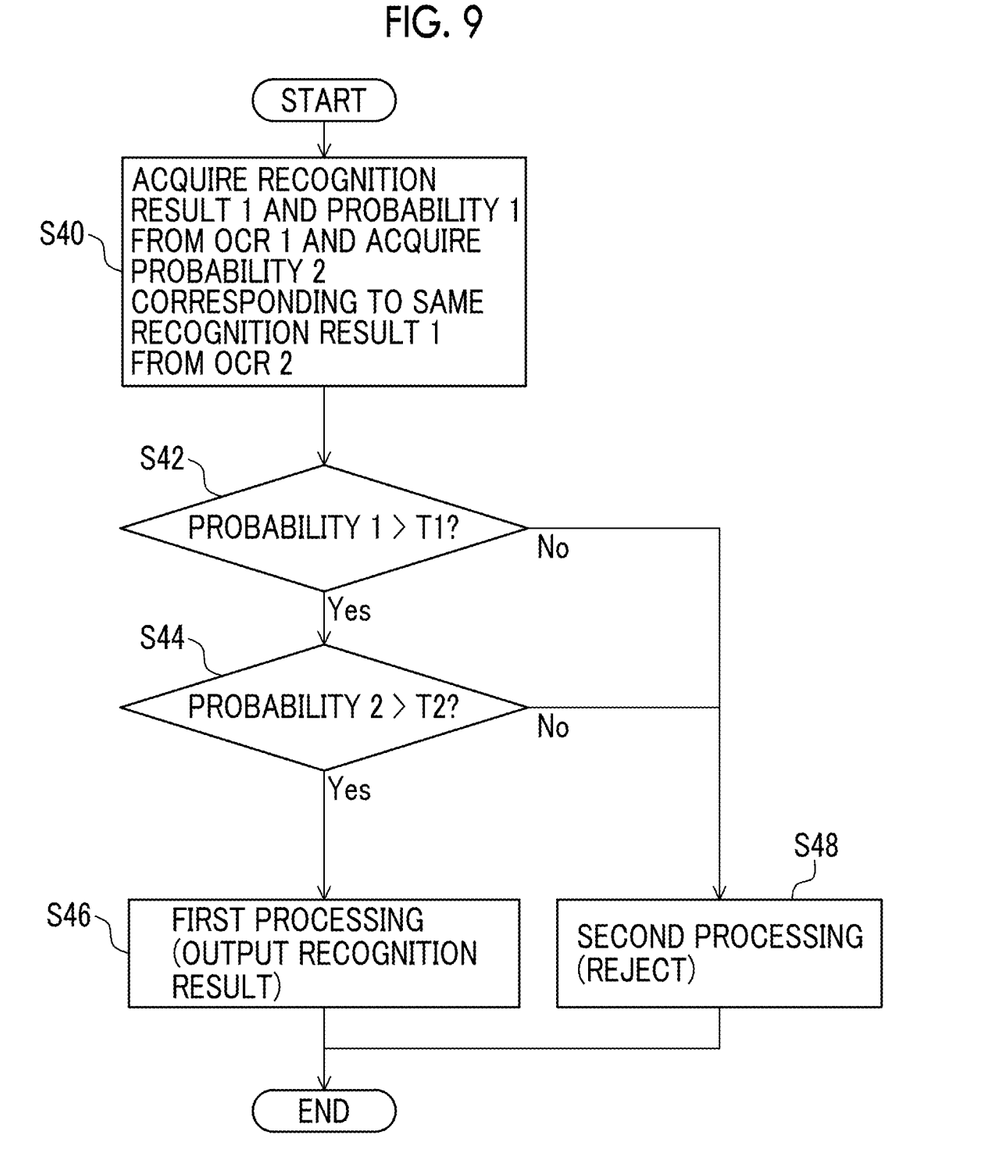
FIG. 9 is a diagram illustrating a processing procedure of the generalized exemplary embodiment.

FIG. 9 illustrates a procedure of the processing. In the procedure, the processor 102 acquires the recognition result 1 and the probability 1 on the input image data 50 from the OCR1, and acquires the probability 2 for the recognition result 1 on the same input image data from the OCR2 (S40). Next, the processor 102 determines whether or not the probability 1 is higher than a predetermined threshold value T1 (S42), and whether or not the probability 2 is higher than a predetermined threshold value T2 (S44). The threshold values T1 and T2 are determined in the same way of thinking as the way of determining the threshold values 1 and 2 described referring to FIG. 5. That is, assuming that the accuracy rate of the system is equal to or greater than a predetermined value with the adoption of the recognition result 1 as the final recognition result in a case where the probability 1 for the recognition result 1 of the OCR1 is higher than the threshold value A, in the example, since the probability 2 is also considered, the threshold value T1 may be a value lower than the threshold value A.

In a case where both of determination results of S42 and S44 are Yes, the processor 102 executes first processing on the recognition result 1 (S16). In the first processing, for example, the recognition result 1 is output as the final recognition result of the system. In a case where at least one of the determination result of S42 or S44 is No, the processor 102 executes second processing (S48). The second processing is processing that requires more operations of the operator than the first processing, and for example, processing in which the recognition result 1 is subjected to verification and correction by the operator is an example of the second processing.

In the example referring to FIGS. 8 and 9, although the two OCRs of the OCR1 and the OCR2 are used, instead, one recognition apparatus having the functions of both of the two OCRs of the OCR1 and the OCR2 may be of course used.

In the system described above referring to FIGS. 8 and 9, similarly to the effects of the processing procedure of FIG. 4 described referring to FIG. 5, it is possible to increase the ratio of application of the first processing while maintaining the accuracy rate.

Although the procedure of FIG. 9 corresponds to the procedure of FIG. 4, as a modification of the procedure of FIG. 9, a procedure having the same relationship as the procedure of FIG. 7 with the procedure of FIG. 4 is also considered. In the procedure of the modification, the information processing apparatus 100 acquires candidates of a plurality of recognition results in a descending order of the probability and the probabilities of the candidates from the OCR1, and acquires the probability for the recognition result having the same value as each candidate from the OCR2. Subsequent processing may be the same as the procedure shown in FIG. 7.

The exemplary embodiment described above is merely exemplary. Various modifications can be made without departing from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
execute first acquisition processing for acquiring, from a first recognizer, a first recognition result and a first recognition probability on target data,
execute second acquisition processing for acquiring, from a second recognizer, a second recognition probability on the first recognition result acquired from the first recognizer, and
execute control for determining which of first processing and second processing with a necessary human workload greater than in the first processing is to be executed for the first recognition result based on the first recognition probability and the second recognition probability, wherein
the second recognizer obtains a plurality of recognition result candidates,
the processor acquires one of the plurality of recognition result candidates as the second recognition probability from the second recognizer, wherein the one of the plurality of recognition result candidates is the same as the first recognition result,
wherein, when the processor is configured to execute control for determining which of first processing and second processing is to be executed for the first recognition result, the first processing is executed in a case where the first recognition probability is higher than a first threshold value and the second recognition probability different from the first recognition probability is higher than a second threshold value, and the second processing is executed otherwise.

2. The information processing apparatus according to claim 1,
wherein, in the first acquisition processing, a plurality of candidates of the first recognition result on the target data and a first candidate recognition probability as a recognition probability for each candidate are acquired from the first recognizer,
in the second acquisition processing, for each candidate, a second candidate recognition probability as a recognition probability for the candidate on the target data is acquired from the second recognizer, and
when the processor is configured to execute control for determining which of first processing and second processing is to be executed for the first recognition result, in a case where there is a candidate, of which the first candidate recognition probability is higher than the first threshold value and the second candidate recognition probability is higher than the second threshold value, among the plurality of candidates, the first processing is executed on the candidate.

3. The information processing apparatus according to claim 1,
wherein the first recognizer recognizes a text string represented by a text string image as the target data and obtains the recognized text string as the first recognition result, and
the second recognizer recognizes a text represented by the text age for each text image included in the text string image and obtains, as the second recognition probability, a recognition probability for a recognition result representing a text corresponding to the text image in the text string represented by the first recognition result among a plurality of recognition results for the text image.

4. The information processing apparatus according to claim 3,
wherein, when the processor is configured to execute control for determining which of first processing and second processing is to be executed for the first recognition result, the first processing is executed in a case where the first recognition probability is higher than the first threshold value and the second recognition probability for each text in the text string represented by the first recognition result is higher than the second threshold value, and the second processing is executed otherwise.

5. The information processing apparatus according to claim 1,
wherein, in the first acquisition processing, a plurality of candidates of the first recognition result on the target data and a first candidate recognition probability as a recognition probability for each candidate are acquired from the first recognizer,
in the second acquisition processing, for each candidate, a second candidate recognition probability as a recognition probability for each text in the text string of the candidate on the target data is acquired from the second recognizer, and when the processor is configured to execute control for determining which of first processing and second processing is to be executed for the first recognition result, in a case where there is a candidate, of which the first candidate recognition probability is higher than the first threshold value and the second candidate recognition probability for each text is higher than the second threshold value, among the plurality of candidates, the first processing is executed on the candidate.

6. The information processing apparatus according to claim 1,
wherein the first recognition result has the highest recognition probability among recognition results on the target data from the first recognizer.

7. A non-transitory computer readable medium storing a program that causes a computer to execute processing for
executing first acquisition processing for acquiring, from a first recognizer, a first recognition result and a first recognition probability on target data,
executing second acquisition processing for acquiring, from a second recognizer, a second recognition probability on the first recognition result acquired from the first recognizer, and
executing control for determining which of first processing and second processing with a necessary human workload greater than in the first processing is to be executed for the first recognition result based on the first recognition probability and the second recognition probability, wherein
the second recognizer obtains a plurality of recognition result candidates,
the computer acquires one of the plurality of recognition result candidates as the second recognition probability from the second recognizer, wherein the one of the plurality of recognition result candidates is the same as the first recognition result,
wherein, when the computer is configured to execute control for determining which of first processing and second processing is to be executed for the first recognition result, the first processing is executed in a case where the first recognition probability is higher than a first threshold value and the second recognition probability different from the first recognition probability is higher than a second threshold value, and the second processing is executed otherwise.

* * * * *